Aug. 25, 1964     D. R. KNOWLTON     3,145,439

MOLDING FASTENER

Filed Jan. 19, 1962

Inventor:
David R. Knowlton,
by Walter S. Jones
Atty.

United States Patent Office 3,145,439
Patented Aug. 25, 1964

3,145,439
MOLDING FASTENER
David R. Knowlton, Ipswich, Mass., assignor to United-Carr Incorporated, a corporation of Delaware
Filed Jan. 19, 1962, Ser. No. 167,305
1 Claim. (Cl. 24—73)

This invention aims to provide improvements in locking fastener devices particularly useful in connection with holding a trim molding to a supporting structure.

An object of the invention is to provide a locking fastener device formed from malleable material and having a base portion provided with molding engaging means and attaching means extending from the base portion in the form of a hollow boss preferably divided into two portions one of which is in the form of a hook portion and the other of which is in the form of a bendable, locking portion adapted to be moved away from the hook portion by a suitable tool—such, for instance, as a pliers.

In the drawings which illustrate the preferred embodiment of the invention:

Heretofore many locking fastener devices similar to that illustrated by the drawings have been used particularly in the automotive and appliance fields and the present device is a patentable improvement because it is structurally different and has much stronger holding power when the fastener is attached to a support.

An important feature of the invention is in the construction of the attaching means by which the fastener device is attached to a support. The attaching means is formed from a hollow boss extending from the underside of the fastener device and preferably divided into a hook shape portion and a bendable and/or movable locking portion which is mechanically movable away from the hook portion by a suitable tool to lock the device firmly to the support.

Figure 6:
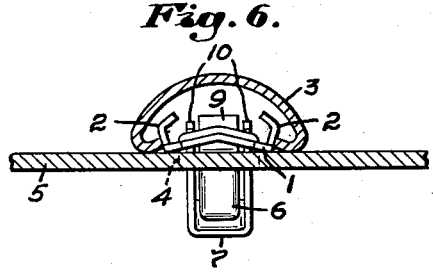
FIG. 6 is an edge view of the installation shown in FIG. 5 with the addition of a section of molding in attached position.
Figure 7:
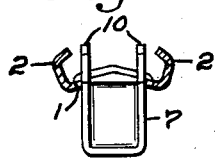
FIG. 7 is a section taken on the line 7—7 of FIG. 2.

In the particular construction illustrated, the fastener is shown as provided with an elongated relatively rigid base portion 1 having molding engaging portions 2—2 at opposite sides of the base portion 1 and shaped to receive, by snap action, a hollow molding 3, as shown in FIG 6.

Figure 3:
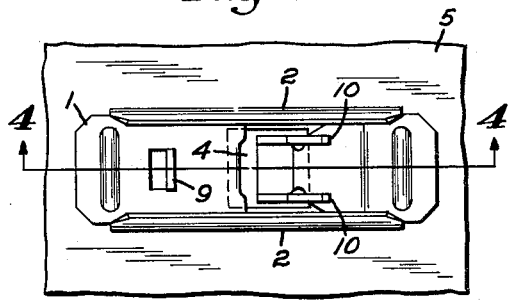
FIG. 3 is a plan view of the fastener device in position ready for attachment to a supporting structure.

The locking fastener device also has a hollow cup shaped boss portion extending from the underside of the base and this boss portion is preferably non-circular in cross section so as to cooperate with a similarly shaped aperture 4 formed in a supporting plate 5. In the preferred construction illustrated the cross sectional shape of the boss providing the attaching means is polygonal (in this case rectangular) and it passes through the rectangular aperture 4, the shape of which is best shown in dotted outline in FIG. 3. Thus, when the fastener is attached to the support 5 it may be held in a given non-rotatable position.

The hollow boss, providing the attaching means, is provided with a hook shaped portion 6 formed by one side wall of the boss and also a locking portion 7 provided by the other three sides and the bottom of the hollow boss. Thus, it will be seen that the locking portion is of particularly strong cross sectional shape so that when it is bent into the position shown in FIG. 5 this strong construction will resist forces tending to return the locking portion to the position shown in FIG. 4.

Figure 1:
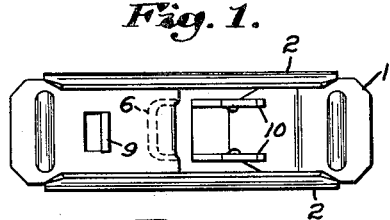
FIG. 1 is a plan view of an improved locking fastener device.
Figure 2:
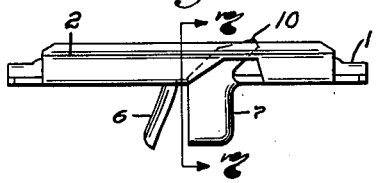
FIG. 2 is a side view of the device shown in FIG. 1.
Figure 4:
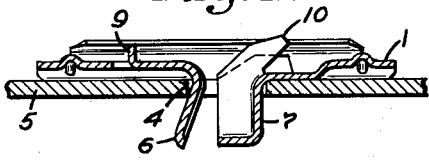
FIG. 4 is a section taken on the line 4—4 of FIG. 3.
Figure 5:
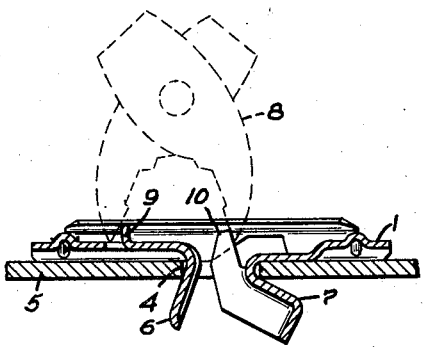
FIG. 5 is a section similar to FIG. 4 showing a portion of a pinching tool in the act of final attachment of the fastener device to the support.

While the locking portion may be bent, from the position shown in FIG. 4 to the position shown in FIG. 5, by a screw driver or any other suitable tool it is preferred to accomplish this action by a pliers 8 partially shown in dotted lines in FIG. 5. To provide gripping elements for the pliers an upstanding portion 9 is formed in the base portion 1 between the molding engaging portions 2—2 as shown in FIGS. 1 and 5. Other pliers gripping portions 10—10 are formed as extensions on opposite sides of the locking portion 7 and are also located between the molding engaging portions 2—2 as shown in FIGS. 1 and 4.

In assembling the application the locking fastener device is first placed upon the supporting member 5 with the hook shaped portion 6 and the locking portion 7 extending through the aperture 4 (FIG. 4). Then a pliers is engaged with the gripping portions 9 and 10—10 and the pliers squeezed as shown in FIG. 5 until the locking portion is bent or moved into the position shown in FIG. 5 thereby securely attaching the locking fastener device in position. Thereafter, the molding 3 is snapped over the molding engaging portions 2—2 (FIG. 6) thereby providing a simple, particularly strong installation.

It will be apparent to anyone skilled in the art that the construction of the locking portion of applicant's attaching means makes for a much stronger attachment of the locking fastener device than would be the case if the locking portion were merely a flat bent finger, as in known prior construction, such as illustrated and described in the United States patent to Waara, No. 2,460,-722, issued, February 1, 1949.

While there has been illustrated and described a preferred embodiment of the invention it should be understood that variations thereof, particularly in the shape of the hollow boss, are contemplated and therefore the invention is best defined by the following claim.

I claim:

A unitary fastener device for holding an article to a support, said fastener device having a base portion, article engaging means provided as a part of said base portion and attaching means extending from said base portion formed to make attaching engagement with a suitable support, said attaching means extending from said base portion and continuously presented at the underside of said base portion and said attaching means being divided into two opposed portions, one of which is in the form of a hook portion and the other of which is in the form of a locking portion spaced from said hook portin and being provided with an extension which protrudes above the plane of said base portion on the opposite side from the main part of said locking portion, and an upstanding portion extending from said base portion and spaced from said extension and on the same side of said base as said extension, whereby a pair of pliers or the like applied to said extension and said upstanding portion will engage said locking portion with a support.

References Cited in the file of this patent
UNITED STATES PATENTS

| | | |
|---|---|---|
| 2,601,803 | Newman | July 1, 1952 |
| 2,748,645 | Peckham et al. | June 5, 1956 |
| 2,900,687 | Cochran | Aug. 25, 1959 |
| 3,019,409 | Sarafinas | Jan. 30, 1962 |